(12) United States Patent
Suzuki (10) Patent No.: US 7,365,730 B2
(45) Date of Patent: Apr. 29, 2008

(54) DOUBLE-SIDED LIQUID CRYSTAL DISPLAY DEVICE

(75) Inventor: Nobutaka Suzuki, Fujimo-machi (JP)

(73) Assignee: Seiko Epson Corporation, Tokyo (JP)

( * ) Notice: Subject to any disclaimer, the term of this patent is extended or adjusted under 35 U.S.C. 154(b) by 610 days.

(21) Appl. No.: 10/889,136

(22) Filed: Jul. 13, 2004

(65) Prior Publication Data
US 2005/0052383 A1 Mar. 10, 2005

(30) Foreign Application Priority Data
Jul. 31, 2003 (JP) ............................. 2003-204700

(51) Int. Cl.
G09G 3/36 (2006.01)
(52) U.S. Cl. ...................... 345/102; 345/1.1
(58) Field of Classification Search ................ 345/1.1, 345/87–102, 30, 32, 38, 39, 40; 455/566; 362/561, 600; 349/62
See application file for complete search history.

(56) References Cited

U.S. PATENT DOCUMENTS

| | | | |
|---|---|---|---|
| 6,574,487 B1 | 6/2003 | Smith et al. | |
| 6,900,864 B2 | 5/2005 | Iino | |
| 7,058,426 B2 * | 6/2006 | Masuda et al. | ............. 455/566 |
| 7,161,644 B2 * | 1/2007 | Kim et al. | .................... 349/62 |
| 2003/0063456 A1 | 4/2003 | Kitahira | |
| 2003/0090455 A1 * | 5/2003 | Daly | .......................... 345/102 |
| 2003/0112217 A1 * | 6/2003 | Lee | ............................ 345/102 |
| 2005/0073627 A1 | 4/2005 | Akiyama | |

FOREIGN PATENT DOCUMENTS

| | | |
|---|---|---|
| CN | 1310569 A | 8/2001 |
| CN | 1391130 A | 1/2003 |
| JP | A-08184821 | 7/1996 |
| JP | A-2000-075802 | 3/2000 |
| JP | A-2000-155309 | 6/2000 |
| JP | A 2001-67049 | 3/2001 |
| JP | A 2002-244133 | 8/2002 |
| JP | A-2002-372711 | 12/2002 |
| JP | A 2003-20780 | 1/2003 |
| JP | A-2003-098545 | 4/2003 |
| JP | A-2003-215549 | 7/2003 |
| WO | WO 03/029884 A1 | 4/2005 |

* cited by examiner

*Primary Examiner*—Alexander Eisen
*Assistant Examiner*—Christopher E Leiby
(74) *Attorney, Agent, or Firm*—Oliff & Berridge, PLC

(57) ABSTRACT

To achieve thinner liquid crystal display panels and to reduce the power consumption for turning on a backlight during an image display operation to a minimum amount, a controller controls display operations of a main display panel and a sub-display panel via a first driver and a second driver. Based on the controlling of the display operations, the controller performs lighting control of LEDs of a backlight corresponding to the dimensions and position of the display panel used for image display. Accordingly, the backlight can be turned on for the display panel used for image display by consuming a minimum amount of power. Furthermore, the backlight includes a light-guiding plate and multiple LEDs and can emit light from both sides of the backlight, thus achieving reduction in thickness.

8 Claims, 11 Drawing Sheets

DOUBLE-SIDED LIQUID CRYSTAL DISPLAY DEVICE

BACKGROUND OF THE INVENTION

1. Field of Invention

The present invention relates to double-sided liquid crystal display devices, and particularly, to a double-sided liquid crystal display device which is provided with liquid crystal display panels and a double-sided light source assembly that emits light from two sides thereof to function as a backlight for the display panels. In such a device, each liquid crystal display panel is disposed adjacent to any position at each side of the light source assembly. An image display operation is performed by switching between the display panels.

2. Description of Related Art

Double-sided liquid crystal display devices have been used in mobile information terminals, such as mobile phones and PDAs (Personal Digital Assistants) that are provided with foldable covers. On the inner and outer surfaces of the cover of such an information terminal, two liquid crystal display units are disposed in a back-to-back manner to form a double-sided liquid crystal display device. The two liquid crystal display units of related art devices are each provided with a liquid crystal display panel combined with a backlight, and the two units are disposed in a back-to-back manner.

Furthermore, in one related art approach to reduce the thickness of the backlights for the liquid crystal display panels disposed on the two sides of, for example, the cover, light-guiding plates of the backlights for the two liquid crystal display panels are wedge-shaped in cross section. Thus, these light-guiding plates are disposed adjacent to each other such that the two inclined planes of the plates face each other. Moreover, these light-guiding plates are each provided with a light source to emit light, which is disposed adjacent to a side of each plate. Consequently, the thickness of the backlight is reduced. See Japanese Unexamined Patent Application Publication No. 2002-244133.

As another approach to reduce the thickness of the backlights for the liquid crystal display panels disposed on the two sides of, for example, the cover, a related art device uses a common light-guiding plate which can emit light from both sides of the plate. See Japanese Unexamined Patent Application Publication No. 2001-67049.

SUMMARY OF THE INVENTION

According to such double-sided liquid crystal display devices, however, since two liquid crystal display units each having a liquid crystal display panel with a backlight are disposed adjacent to each other in a back-to-back manner, the overall thickness tends to become large and spoil the portability of such information terminals.

Although thickness reduction can be achieved to a certain extent by disposing the two wedge-shaped light-guiding plates adjacent to each other, as in Japanese Unexamined Patent Application Publication No. 2002-244133 mentioned above, the inclined planes of the light-guiding plates each require a reflective sheet thereon, thus increasing the thickness by that much. Moreover, due to the trend of reduced thickness in recent years, a sufficient angle of inclination for the wedge-shaped light-guiding plates cannot be obtained. Consequently, although the manufacturing process of the light-guiding plates becomes more complex, satisfactory results cannot be obtained.

In the case of Japanese Unexamined Patent Application Publication No. 2001-67049 mentioned above, the use of a common light-guiding plate that can emit light from both sides thereof achieves thickness reduction of the backlight. However, as shown in FIGS. 4 and 5 of Japanese Unexamined Patent Application Publication No. 2001-67049, since the display areas of the first liquid crystal display unit and the second liquid crystal display unit are significantly different, the entire common light-guiding plate has to be lit even when performing a display operation using only the liquid crystal display unit having the smaller display area (the second liquid crystal display unit in Japanese Unexamined Patent Application Publication No. 2001-67049). This is disadvantageous for reducing consumption of power. This waste of power becomes larger in proportion to the increase in the ratio of display areas between the two liquid crystal display units.

The present invention addresses the problems mentioned above by providing a double-sided liquid crystal display device which includes liquid crystal display panels on both sides of the device while maintaining a thin structure. Moreover, when switching between liquid crystal display panels to perform a display operation, this device consumes an extremely small amount of power for the backlight.

To address or achieve the above, an exemplary aspect of the present invention provides a double-sided liquid crystal display device which includes a double-sided light source assembly having a planar structure and emitting light from both sides of the assembly, liquid crystal display panels to display an image, and a switching device. The double-sided light source assembly includes a light-emitting-region changing device which changes light-emitting regions in the light source assembly according to the position and dimensions of each of the liquid crystal display panels. At least one liquid crystal display panel is disposed adjacent to any position at each side of the double-sided light source assembly. The light source assembly thus functions as a backlight for each display panel. The switching device performs control of the light-emitting-region changing device in synchronization with the display timing of one of the liquid crystal display panels. Accordingly, the use of the double-sided light source assembly as a backlight achieves thickness reduction of the backlight. Moreover, since the light-emitting-region changing device changes the light-emitting regions of the double-sided light source assembly according to the position and dimensions of each of the liquid crystal display panels and the switching device performs control of the light-emitting-region changing device in synchronization with the display timing of one of the liquid crystal display panels, the power consumption required to perform a display operation in a selected liquid crystal display panel is reduced to a minimum amount.

Furthermore, according to an exemplary aspect of the present invention, the double-sided light source assembly includes at least a light source and a light-guiding plate. In such a case, the light-emitting-region changing device includes a plurality of light-emitting device disposed side by side in the light-guiding plate. The switching device thus performs control of the light-emitting device so as to turn on the light-emitting device corresponding to the position and dimensions of each of the liquid crystal display panels in synchronization with the display timing of a corresponding liquid crystal display panel. Accordingly, since the light-emitting-region changing device includes a plurality of the light-emitting devices disposed side by side in the light-guiding plate and the switching device turns on the light-emitting device corresponding to the position and dimensions of one of the liquid crystal display panels in synchronization with the display timing of the corresponding liquid crystal display panel, the light-emitting regions can be readily changed. This may reduce the power consumption of the backlight to a minimum amount.

Furthermore, according to an exemplary aspect of the present invention, the light-emitting device includes light emitting diodes which are arrayed side by side in a line on a side of the light-guiding plate so that the light-guiding plate may function as a planar light source. Accordingly, the use of the light-emitting diodes, i.e. point light sources, as the light-emitting device, achieves lower power consumption. Furthermore, the use of the diodes permits multiple options for the color of the backlight, and moreover, reduces costs required for the light source assembly.

Furthermore, according to an exemplary aspect of the present invention, the light-guiding plate further includes at least one of a lens sheet and a diffusion sheet on a surface of the light-guiding plate. Accordingly, since at least one of a lens sheet (a prismatic sheet) and a diffusion sheet may be disposed on a surface of the light-guiding plate, a greater intensity of light can be emitted from the light-guiding plate.

Furthermore, according to an exemplary aspect of the present invention, the double-sided light source assembly includes a transparent substrate and electroluminescent elements functioning as the light-emitting-region changing device. The electroluminescent elements are provided in different light-emitting regions on the transparent substrate and are capable of emitting light from both sides of the elements. Moreover, the switching device turns on the electroluminescent elements corresponding to the position and dimensions of one of the liquid crystal display panels in synchronization with the display timing of the corresponding liquid crystal display panel. Accordingly, since the double-sided light source assembly includes the transparent substrate and the electroluminescent elements which function as the light-emitting-region changing device and are provided in different light-emitting regions on the transparent substrate, and the switching device turns on the electroluminescent elements corresponding to the position and dimensions of one of the liquid crystal display panels in synchronization with the display timing of the corresponding liquid crystal display panel, a low power consumption can be achieved. Moreover, this permits multiple options for the color of the backlight as well as flexibility in the shape of the light-emitting regions.

Furthermore, according to an exemplary aspect of the present invention, when the liquid crystal display panels are respectively disposed on the inner surface and the outer surface of a cover which can be opened or closed, the switching device performs control of the light-emitting-region changing device in response to the opening/closing state of the cover. Accordingly, since the liquid crystal display panels are respectively disposed on the inner surface and the outer surface of the cover which can be opened or closed and the switching device performs control of the light-emitting-region changing device in response to the opening/closing state of the cover, a simple and reliable switching operation of the backlight can be achieved in a case where the switching between the display panels is performed based on the opening/closing action of the cover.

Furthermore, according to an exemplary aspect of the present invention, the double-sided light source assembly and at least one of the liquid crystal display panels have at least one light-blocking layer therebetween. The light-blocking layer is disposed in a region not having a liquid crystal display panel adjacent thereto. Accordingly, since the light-blocking layer between one of the liquid crystal display panels and the double-sided light source assembly is disposed in a region not having the liquid crystal display panel adjacent thereto, boundary lines formed by the other liquid crystal display panel on the opposite side of the double-sided light source assembly may be reduced or prevented from being visible through the double-sided light source assembly, thus achieving a high-quality image display. Alternatively, the double-sided light source assembly and at least one of the liquid crystal display panels may have therebetween at least one transflective layer, such as a half-mirror or a reflective polarizer. Moreover, in such a structure, the light-blocking layer may be disposed between one of the liquid crystal display panels and the half-mirror or the reflective polarizer.

BRIEF DESCRIPTION OF THE DRAWINGS

FIGS. 1A and 1B are schematics of a foldable PDA including a double-sided liquid crystal display device according to a first exemplary embodiment of the present invention, where

DETAILED DESCRIPTION OF EXEMPLARY EMBODIMENTS

Exemplary embodiments of a double-sided liquid crystal display device according to the present invention will now be described in detail with reference to the drawings. It should be noted that the present invention is not limited to the exemplary embodiments described below.

First Exemplary Embodiment

Figure 1A:
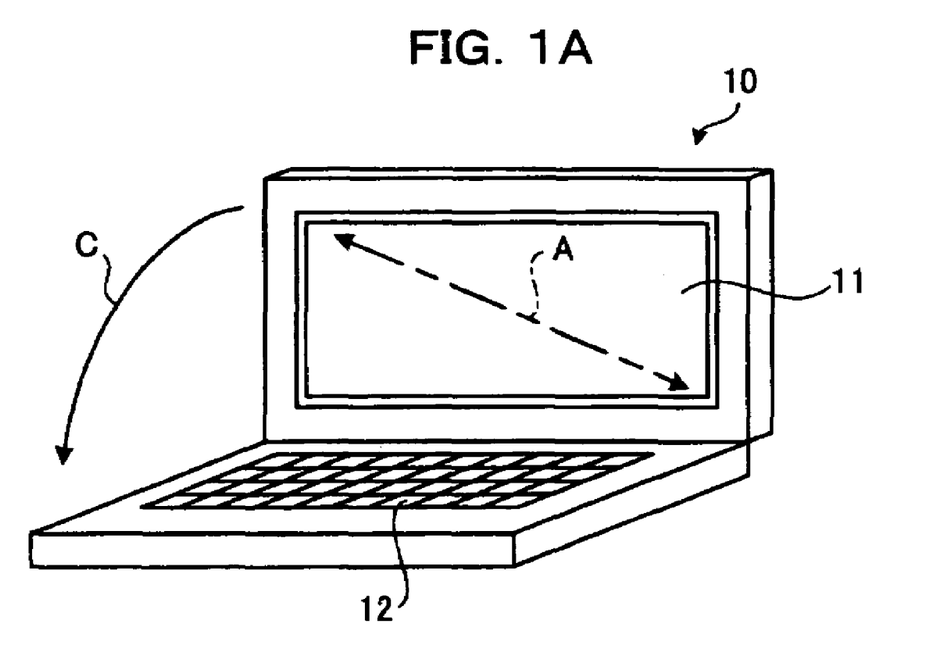
FIG. 1A is a schematic showing the PDA in a state where a cover is opened.
Figure 1B:
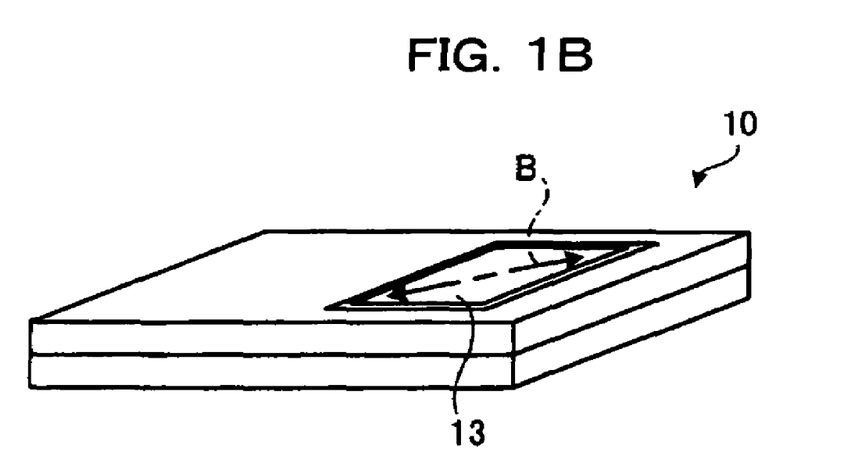
FIG. 1B is a schematic showing the PDA in a state where the cover is closed.

FIGS. 1A and 1B are schematics of a foldable PDA (Personal Digital Assistant) 10 including a double-sided liquid crystal display device of a first exemplary embodiment according to the present invention. FIG. 1A is a schematic showing the PDA 10 in a state where a cover is opened. FIG. 1B is a schematic showing the PDA 10 in a state where the cover is closed. As shown in FIG. 1A, the PDA 10 is provided with a 5-inch main display panel 11 (A=5 inches) on the inner surface of the cover, and a main body 12 which is combined with the cover by a hinge in a foldable manner and which includes, for example, a keyboard, a controller, a processor, and memory. When the cover of the PDA 10 is closed in a direction indicated by an arrow C, as seen from FIG. 1B, the PDA 10 is provided with a 2-inch sub-display panel 13 (B=2 inches) on the outer surface, i.e. the rear surface of the cover.

Figure 2:
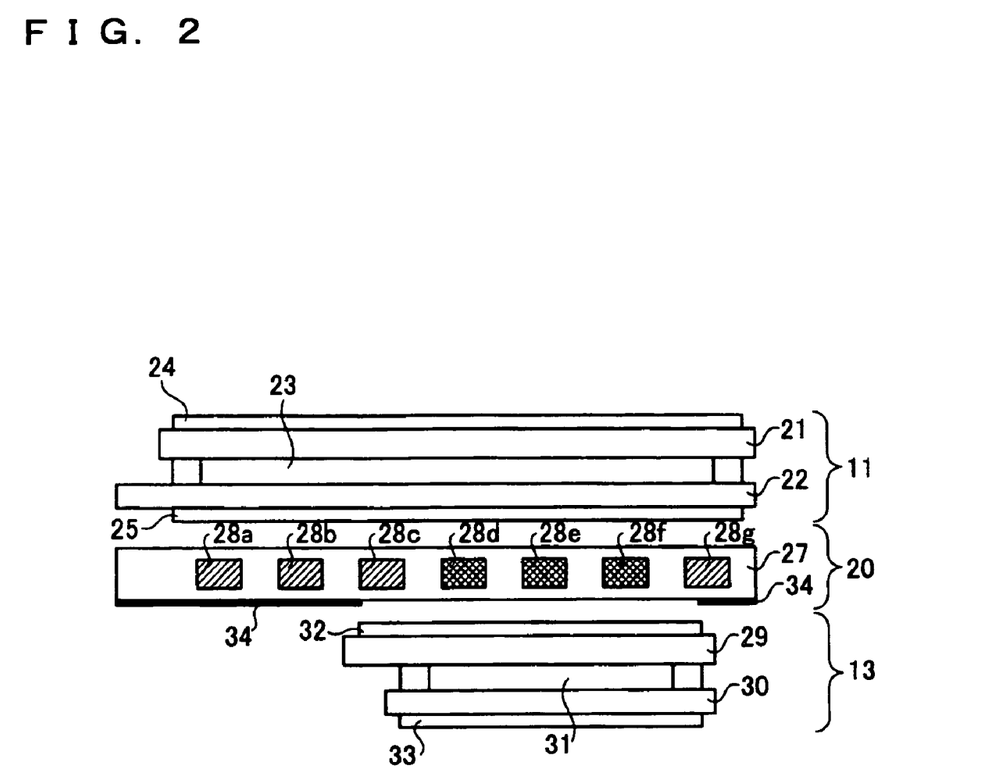
FIG. 2 is a cross-sectional schematic illustrating the structure of the main display panel and the sub-display panel of FIGS. 1A and 1B according to the first exemplary embodiment.

FIG. 2 is a schematic illustrating the structure of the main display panel 11 and the sub-display panel 13 of FIGS. 1A and 1B according to the first exemplary embodiment. As shown in FIG. 2, the main display panel 11 and the sub-display panel 13 have a backlight 20 therebetween. The backlight 20 includes a common light-guiding plate 27 having multiple LEDs (light emitting diodes) 28a to 28g (seven LEDs in this exemplary embodiment). The LEDs 28a to 28g are arrayed in a line on a side of the light-guiding plate 27. The light-guiding plate 27 includes microparticles which reflect light emitted from the LEDs in a scattered manner so that the light is released from both sides of the plate 27.

The main display panel 11 includes two glass substrates 21 and 22 between which transparent electrodes and an alignment film are disposed, which are not shown in the drawings. The glass substrates 21 and 22 include liquid crystal 23 therebetween. Polarizers 24 and 25 are disposed on the respective outer surfaces of the glass substrates 21 and 22. Similarly, the sub-display panel 13 includes two glass substrates 29 and 30 between which transparent electrodes and an alignment film are disposed. The glass substrates 29 and 30 include liquid crystal 31 therebetween. Polarizers 32 and 33 are disposed on the respective outer surfaces of the glass substrates 29 and 30. According to the first exemplary embodiment, as viewed from the display face side of the main display panel 11, one region of the light-guiding plate 27 has the sub-display panel 13 adjacent to the opposite side of the plate 27, whereas the other regions of the light-guiding plate 27 do not. This is due to the use of the common light-guiding plate 27 for the backlight 20. Accordingly, to reduce or prevent boundary lines between regions of different light transmittances from being visible, segments of a light-blocking layer 34 are provided in the regions of the light-guiding plate 27 not having the sub-display panel 13 adjacent thereto.

Figure 3:
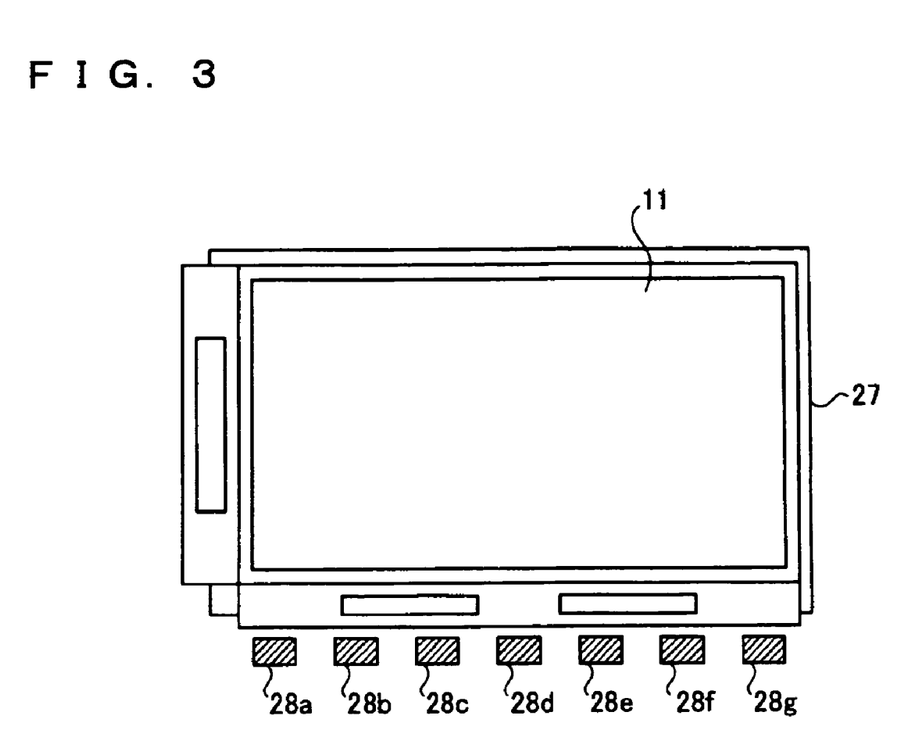
FIG. 3 is a schematic illustrating the main display panel in a state where LEDs are turned on for image display.
Figure 4:
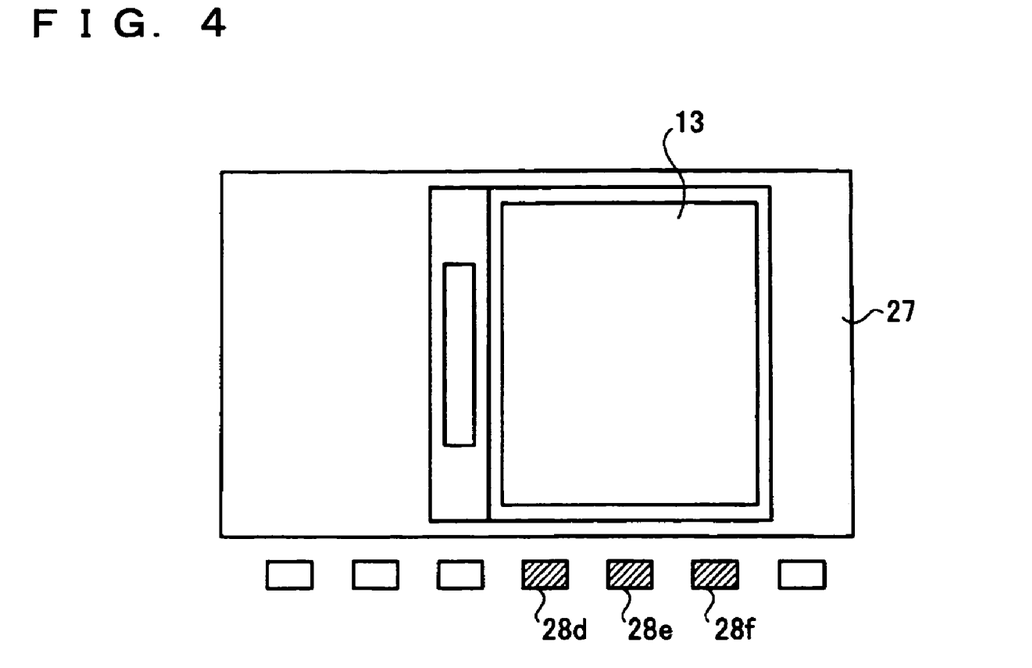
FIG. 4 is a schematic illustrating the sub-display panel in a state where the LEDs are turned on for image display.

As shown in FIG. 2, the main display panel 11 displays an image in a state where all of the LEDs 28a to 28g (seven LEDs) in the light-guiding plate 27 of the backlight 20 are turned on. The sub-display panel 13 displays an image in a state where only the LEDs 28d to 28f (three LEDs) of the light-guiding plate 27 are turned on. FIG. 3 is a schematic illustrating the main display panel 11 in a state where the LEDs 28a to 28g are turned on for image display. FIG. 4 is a schematic illustrating the sub-display panel 13 in a state where only the LEDs 28d to 28f are turned on for image display. The lighting control of the LEDs is performed by a controller 40 shown in FIG. 5.

Figure 5:
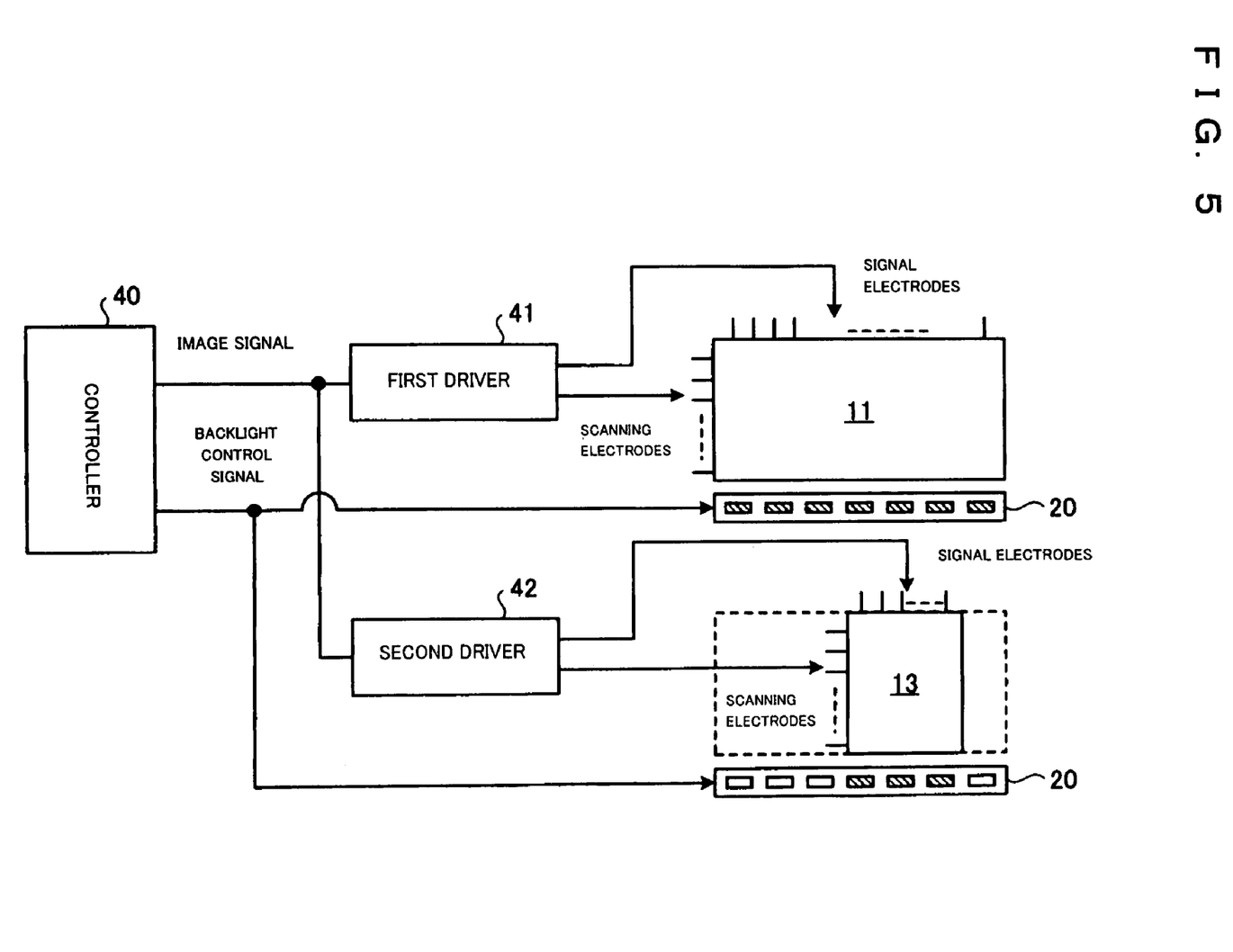
FIG. 5 is a schematic illustrating the switching operation between the display panels of the double-sided liquid crystal display device according to the first exemplary embodiment.

FIG. 5 is a schematic illustrating the switching operation between the display panels 11 and 13 of the double-sided liquid crystal display device according to the first exemplary embodiment. As shown in FIG. 5, the image display operation of the main display panel 11 is performed by a first driver 41, and the image display operation of the sub-display panel 13 is performed by a second driver 42. In response to an image signal output from the controller 40, one of the first and second drivers 41 and 42 applies a driving voltage to signal electrodes and scanning electrodes of the corresponding liquid crystal display panel 11 or 13, whereby an image is displayed in the corresponding display panel.

Furthermore, depending on which display panel will be used for image display, i.e. the main display panel 11 or the sub-display panel 13, the controller 40 outputs a backlight control signal corresponding to the position and dimensions of the liquid crystal display panel 11 or 13 to be used. The backlight control signal turns on the LEDs in the light-guiding plate 27 corresponding to the display panel used for the image display operation. According to the first exemplary embodiment, although the lighting control of the LEDs is performed based on which liquid crystal display panel will be used for image display, the present invention does not necessarily fall within this restriction. For example, referring to FIG. 1, a magnet and a magnetic sensor may be provided in the folded section of the cover of the PDA 10. In this case, the lighting control of the LEDs may be performed in response to an open/close signal generated by the magnet and the magnetic sensor during opening or closing of the cover. In particular, when the cover is opened (the state in FIG. 1A), the LEDs corresponding to the main display panel 11 (all seven LEDs) are turned on. When the cover is closed (the state in FIG. 1B), the LEDs corresponding to the sub-display panel 13 (three LEDs) are turned on.

Figure 6:
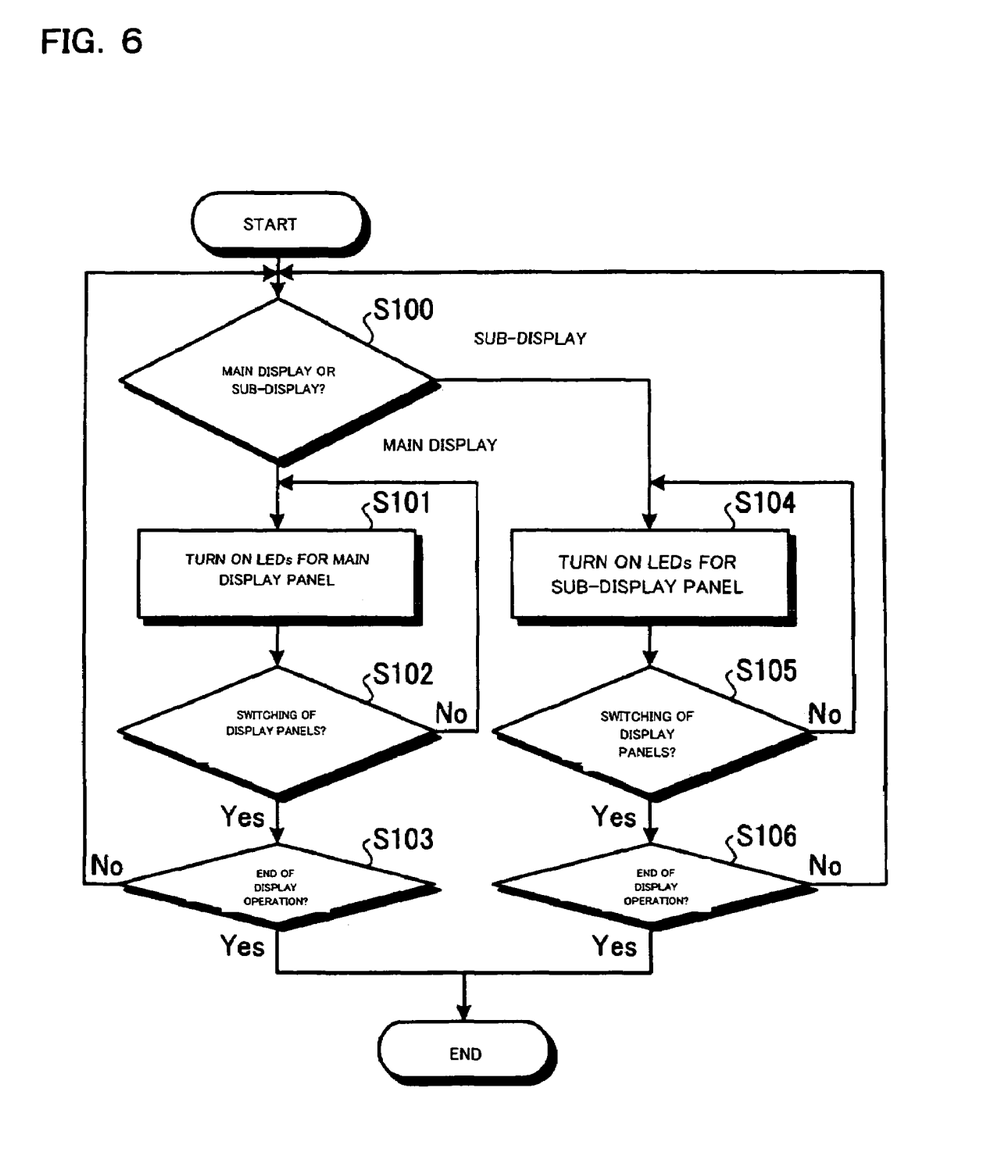
FIG. 6 is a flow chart describing the operation of the first exemplary embodiment.

FIG. 6 is a flow chart describing the operation of the first exemplary embodiment. As shown in FIG. 6, because the controller 40 controls the display operations of the main display panel 11 and the sub-display panel 13, the controller 40 is capable of determining which display panel is being used for image display (step S100).

If it is determined that a main display operation is performed in the main display panel 11, the operation proceeds to step S101 where the controller 40 controls the seven LEDs corresponding to the main display panel 11 to turn on the seven LEDs (see FIG. 3). While the display operation remains in the main display panel 11 and is not switched to the sub-display panel 13, the operation returns to step S101 to keep the LEDs on (step S102).

If it is determined that switching of the display panels is performed in step S102, the operation proceeds to step S103 where it is determined whether or not the display operation is finished. If it is determined that the display operation is not finished, the operation returns to step S100 to repeat the lighting control of the LEDs depending on which display panel is to be used for image display, i.e. the main display panel 11 or the sub-display panel 13.

Furthermore, in step S100, if it is determined that a sub-display operation is performed in the sub-display panel 13, the operation proceeds to step S104 where the controller 40 controls the three LEDs corresponding to the sub-display panel 13 to turn on the three LEDs (see FIG. 4). While the display operation remains in the sub-display panel 13 and is not switched to the main display panel 11, the operation returns to step S104 to keep the LEDs on (step S105).

If it is determined that switching of the display panels is performed in step S105, the operation proceeds to step S106 where it is determined whether or not the display operation is finished. If it is determined that the display operation is not finished, the operation returns to step S100 to repeat the lighting control of the LEDs depending on which display panel is to be used for image display, i.e. the main display panel 11 or the sub-display panel 13. In step S103 or step S106, if it is determined that the display operation is finished, the lighting control of the LEDs is terminated.

As described above, according to the first exemplary embodiment, since the main display panel 11 and the sub-display panel 13 are disposed on the each side of the single common light-guiding plate 27, the total thickness of the double-sided liquid crystal display device is reduced. Furthermore, this also contributes to a great reduction of the number of components as well as lower costs.

According to the first exemplary embodiment, the lighting control of the LEDs is performed based on which display panel is to be used for image display, i.e. the main display panel 11 or the sub-display panel 13. Thus, the LEDs corresponding to the dimensions and position of the selected display panel are turned on. This reduces the power consumption of the backlight 20 to a minimum amount since only the LEDs in the backlight region necessary for the image display operation can be turned on. For example, there are seven LEDs in total in the first exemplary embodiment and only three of the LEDs are used for image display by the sub-display panel 13, which leads to a reduction of the power consumption by about 57%.

Furthermore, although the boundary lines between the region having the sub-display panel 13 behind the light-guiding plate 27 and the regions not having the sub-display panel 13 behind the light-guiding plate 27 are visible without the light-blocking layer 34, referring to FIG. 2, the light-blocking layer 34 in the first exemplary embodiment reduces or prevents the boundary lines from being noticeable and thus contributes to a high-quality image display. Additionally, (although not shown in the drawings,) a transflective layer (such as a half-mirror or a reflective polarizer) may be disposed over the entire surface of the light-guiding plate 27, and the light-blocking layer 34 may be partially disposed over this transflective layer. According to such a structure, since the transflective layer can reflect most of the light rays of the backlight 20, the difference in light absorption between the polarizer 32 of the sub-display panel 13 and the light-blocking layer 34 is reduced. Thus, the boundary lines may become even less noticeable. Moreover, the reflection by the transflective layer (a half-mirror or a reflective polarizer) may enhance the brightness of the main display panel 11. In this case, the arrangement of the components from the double-sided light source assembly may be in the following order: the transflective layer (a half-mirror or a reflective polarizer), the light-blocking layer 34, and the sub-display panel 13. Here, a half-mirror is formed of a thin metal film having a predetermined thickness. By controlling the thickness of the film, the ratio between the reflectance of incident light and the transmittance of incident light can be adjusted. A reflective polarizer reflects a certain polarized light component of the incident light and transmits other polarized light components (for example, D-BEF manufactured by 3M Corp. and PCF manufactured by Nitto Denko Corporation).

According to the first exemplary embodiment, since the lighting control of the LEDs may alternatively be performed based on the opening/closing action of the cover of the PDA 10, the switching between the display panels can be easily performed only by controlling the lighting of the LEDs in conjunction with the opening/closing action.

Second Exemplary Embodiment

Figure 7:
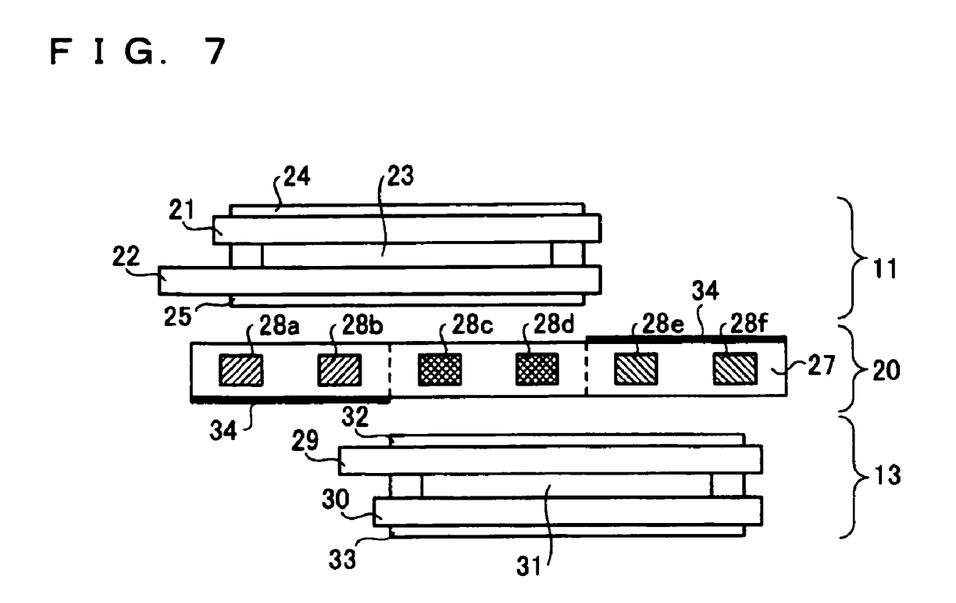
FIG. 7 is a cross-sectional schematic illustrating a main display panel and a sub-display panel according to a second exemplary embodiment.

FIG. 7 is a schematic illustrating a main display panel and a sub-display panel according to a second exemplary embodiment. In FIG. 7, components that are similar or corresponding to the components in FIG. 2 are indicated by the same reference numerals, and the description of those components will be omitted. The main feature of the second exemplary embodiment is that the main display panel 11 and the sub-display panel 13 have the same size but are not aligned with each other in a cross-sectional view. Even in this case, the power consumption of the LEDs of the backlight 20 is similarly reduced.

In related art devices, all six LEDs had to be turned on when the display operation was performed in the main display panel 11 or the sub-display panel 13. However, referring to FIG. 7, according to the second exemplary embodiment, only four LEDs need to be turned on to perform image display in the main display panel 11 or in the sub-display panel 13. This reduces the power consumption by about 33%.

Furthermore, in the second exemplary embodiment, as shown in FIG. 7, since the light-blocking layers 34 are provided in regions of the light-guiding plate 27 not having the liquid crystal display panels adjacent thereto, the boundary lines between the regions having the liquid crystal display panels behind the light-guiding plate 27 and the regions not having the liquid crystal display panels are made hardly noticeable, thus achieving a high-quality image display. Additionally, half-mirrors may be provided over the entire both surfaces of the light-guiding plate 27, and the light-blocking layers 34 may be partially disposed over the half-mirrors. According to such a structure, since the half-mirrors may reflect most of the light rays from the backlight 20, the differences in light absorption between the light-blocking layers 34 and the respective polarizers 25 and 32 of the display panels 11 and 13 are reduced. Thus, the boundary lines may become even less noticeable.

Third Exemplary Embodiment

Figure 8:
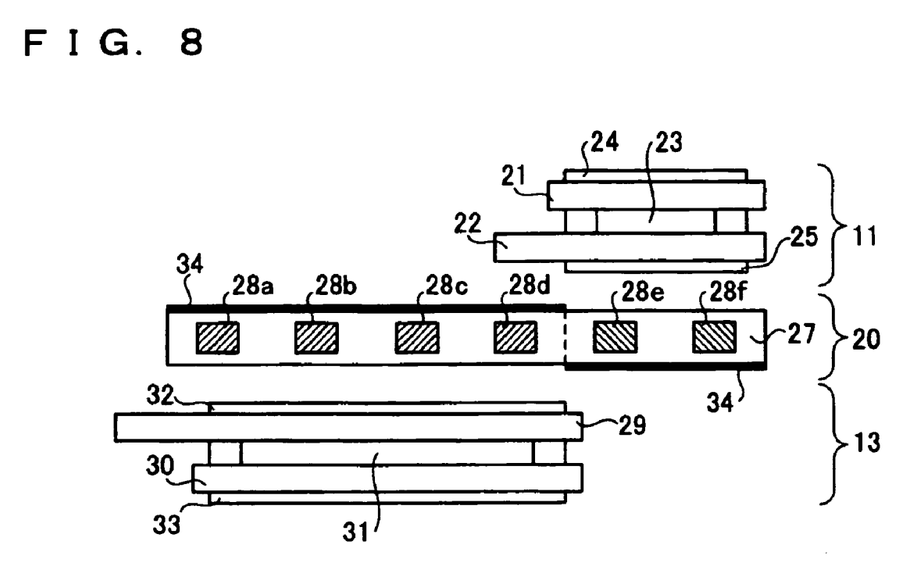
FIG. 8 is a cross-sectional schematic illustrating a main display panel and a sub-display panel according to a third exemplary embodiment.

FIG. 8 is a schematic illustrating a main display panel and a sub-display panel according to a third exemplary embodiment. In FIG. 8, components that are similar or corresponding to the components in FIG. 2 are indicated by the same reference numerals, and the description of those components will be omitted. The main feature of the third exemplary embodiment is that the sub-display panel 13 is larger than the main display panel 11, and the two panels are positioned such that they do not overlap with each other. Also in this case, the power consumption of the LEDs of the backlight 20 is reduced.

In related art devices, all six LEDs had to be turned on when the display operation was performed in the main display panel 11 or the sub-display panel 13. However, referring to FIG. 8, according to the third exemplary embodiment, only two LEDs need to be turned on for image display by the main display panel 11, reducing the power consumption by about 66%. Moreover, four LEDs need to be turned on for image display by the sub-display panel 13, reducing the power consumption by about 33%.

Furthermore, in the third exemplary embodiment, as shown in FIG. 8, the light-blocking layers 34 are provided in regions of the light-guiding plate 27 not having the liquid crystal display panels adjacent thereto. Although boundary lines are not noticeable in the third exemplary embodiment since the liquid crystal display panels do not overlap with each other, the light-blocking layers 34 block the transmitting light rays, whereby a high-quality image display is achieved.

Fourth Exemplary Embodiment

Figure 9:
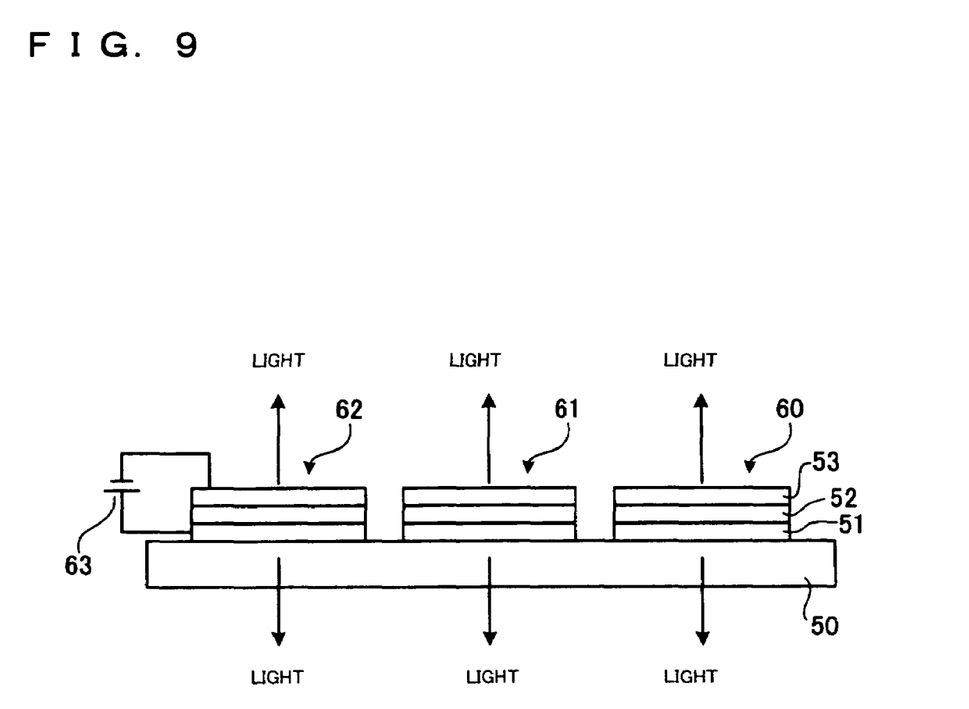
FIG. 9 is a cross-sectional schematic of a double-sided light source assembly including electroluminescent elements according to a fourth exemplary embodiment.

FIG. 9 is a schematic of a double-sided light source assembly including electroluminescent elements 60, 61, and 62 according to a fourth exemplary embodiment. As shown in FIG. 9, the electroluminescent elements 60, 61, and 62 are provided on a transparent substrate 50. Each of the electroluminescent elements 60 to 62 is formed by providing a transparent electrode (anode) 51 composed of a transparent conductive material, such as ITO, on the surface of the substrate 50, and then sequentially stacking on the transparent electrode (anode) 51, a hole transport layer, an emitter layer, an electron transport layer, and a transparent electrode (cathode) 53 formed of a transparent conductive material, such as ITO, in that order. In the fourth exemplary embodiment, the electroluminescent elements 60, 61, and 62 are disposed in different areas separated by a certain distance. Thus, the transparent electrodes 51 and 53 in each area have an organic layer 52 therebetween, and when a power source 63 applies a certain voltage between the electrodes 51 and 53, the entire organic layer 52 emits light. The use of the transparent electrodes 51 and 53 on the transparent substrate 50 allows light rays to be emitted from both sides of the electroluminescent elements 60 to 62.

Figure 10:
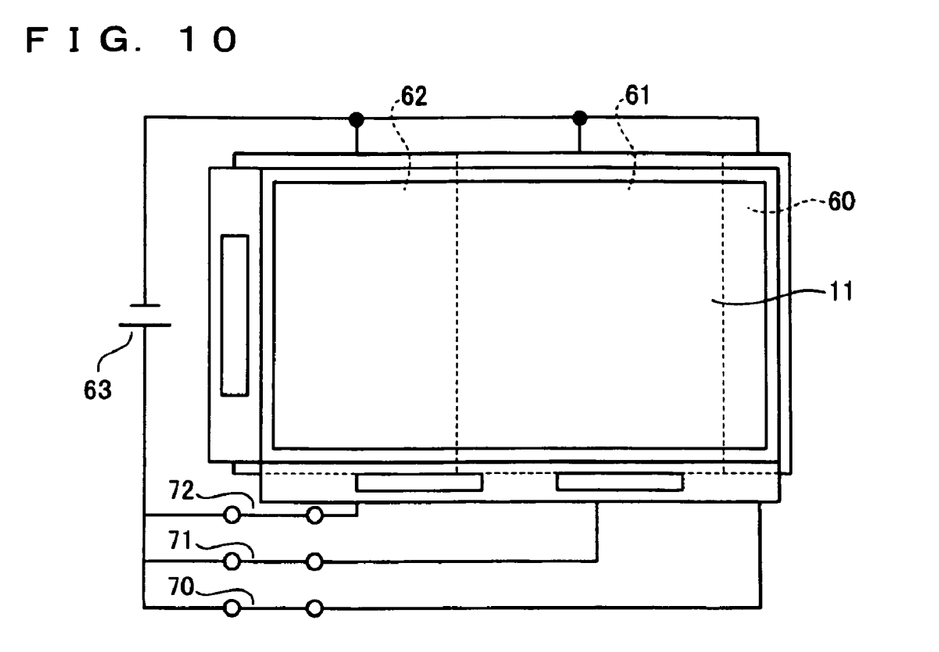
FIG. 10 is a schematic illustrating the main display panel in which the electroluminescent elements of FIG. 9 are used as a backlight.

FIG. 10 is a schematic illustrating the main display panel 11 in which the electroluminescent elements 60, 61, and 62 of FIG. 9 are used as a backlight. Referring to FIG. 10, by turning on switches 70, 71, and 72, all of the electroluminescent elements 60, 61, and 62 emit light. Accordingly, these elements 60, 61, and 62 can be used as a backlight for the main display panel 11.

Figure 11:
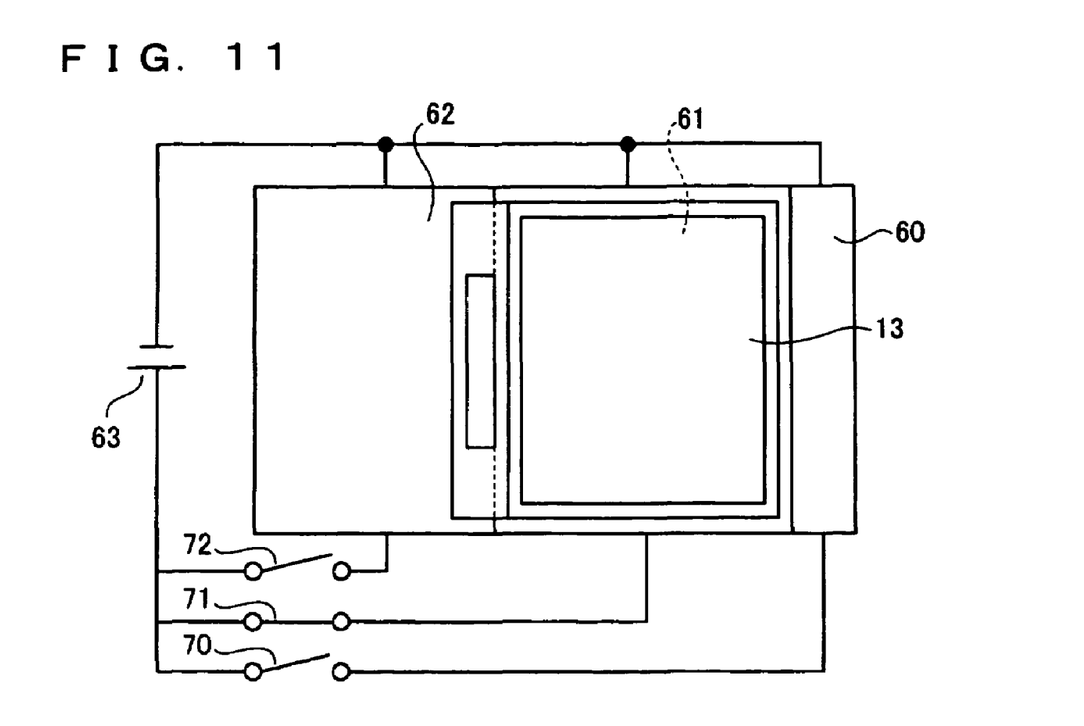
FIG. 11 is a schematic illustrating the sub-display panel in which one of the electroluminescent elements of FIG. 9 is used as a backlight.

FIG. 11 is a schematic illustrating the sub-display panel 13 in which the electroluminescent element 61 of FIG. 9 is used as a backlight. As shown in FIG. 11, by turning on only the switch 71 of the three switches 70, 71, and 72, the electroluminescent element 61 in the center emits light. Accordingly, the element 61 can be used as a backlight for the sub-display panel 13.

According to the fourth exemplary embodiment, each of the electroluminescent elements 60 to 62 defines a light-emitting region. Each region can be readily controlled by adjusting the voltage. These light-emitting regions permit various shapes and dimensions so as to allow flexibility in design. This advantageously leads to further reduction of power consumption.

Although the light-blocking layers 34 of the first to third exemplary embodiments are not shown in FIGS. 10 and 11, the layers 34 are similarly provided in the fourth exemplary embodiment. By providing such light-blocking layers 34, the boundary lines formed by the overlapping of the liquid crystal display panels are made hardly noticeable, thus achieving a high-quality image display.

As described above, according to an exemplary aspect of the present invention, the use of the double-sided light source assembly as a backlight achieves thickness reduction of the backlight. Moreover, since the light-emitting-region changing device changes the light-emitting regions of the double-sided light source assembly according to the position and dimensions of each of the liquid crystal display panels and the switching device performs lighting control of the light-emitting-region changing device in synchronization with the display timing of one of the liquid crystal display panels, the power consumption required to perform a display operation in a selected liquid crystal display panel is reduced to a minimum amount.

Furthermore, according to an exemplary aspect of the present invention, since the light-emitting-region changing device includes a plurality of light sources disposed in the light-guiding plate and the switching device turns on the light-emitting source corresponding to the position and dimensions of one of the liquid crystal display panels in synchronization with the display timing of the corresponding liquid crystal display panel, the light-emitting regions can be readily changed. This may reduce the power consumption of the backlight to a minimum amount.

Furthermore, according to an exemplary aspect of the present invention, the use of the light-emitting diodes, i.e. point light sources, as the light sources achieves lower power consumption. Furthermore, the use of the diodes permits multiple options for the color of the backlight, and moreover, reduces costs required for the light source assembly.

Furthermore, according to an exemplary aspect of the present invention, since at least one of a lens sheet (a prismatic sheet) and a diffusion sheet is disposed on a surface of the light-guiding plate, a greater intensity of light can be emitted from the light-guiding plate.

Furthermore, according to an exemplary aspect of the present invention, since the double-sided light source assembly includes a transparent substrate and electroluminescent elements which function as the light-emitting-region changing device and are provided in different light-emitting regions on the transparent substrate, and the switching device turns on the electroluminescent elements corresponding to the position and dimensions of one of the liquid crystal display panels in synchronization with the display timing of the corresponding liquid crystal display panel, a low power consumption may be achieved. Moreover, this permits multiple options for the color of the backlight as well as flexibility in the shape of the light-emitting regions.

Furthermore, according to an exemplary aspect of the present invention, since the liquid crystal display panels are disposed respectively on the inner surface and the outer surface of the cover which can be opened or closed and the switching device performs control of the light-emitting-region changing device in response to the opening/closing state of the cover, a simple and reliable switching operation of the backlight can be achieved in a case where the switching between the display panels is performed based on the opening/closing action of the cover.

Furthermore, according to an exemplary aspect of the present invention, since at least one light-blocking layer provided between at least one of the liquid crystal display panels and the double-sided light source assembly is disposed in a region not having a liquid crystal display panel adjacent thereto, boundary lines formed by the other liquid crystal display panel on the opposite side of the double-sided light source assembly may be reduced or prevented from being visible, thus achieving a high-quality image display. Alternatively, the double-sided light source assembly and at least one of the liquid crystal display panels may have therebetween at least one transflective layer, such as a half-mirror or a reflective polarizer. Moreover, in such a structure, the light-blocking layer may be disposed between one of the liquid crystal display panels and the half-mirror or the reflective polarizer so that boundary lines formed by the other liquid crystal display panel on the opposite side may be reduced or prevented from being visible, thus achieving a high-quality image display.

What is claimed is:

1. A double-sided liquid crystal display device, comprising:
  a double-sided light source assembly emitting light from both sides thereof, the assembly including a planar structure and a light-emitting-region changing device, the light-emitting-region changing device including a plurality of light sources;

first and second liquid crystal display panels, provided adjacent to opposite sides of the double-sided light source assembly, the first liquid crystal display panel being larger than the second liquid crystal display panel, the light source assembly functioning as a backlight for the display panels; and a control device to perform control of the light-emitting-region changing device to drive all of the light sources in synchronization with a display timing of the first liquid crystal display panel, and to drive only a number of the light sources in synchronization with a display timing of the second liquid crystal display panel, the number of light sources being less than all of the light sources so that more light sources are driven during display timing of the larger first liquid crystal display panel than during display timing of the smaller second liquid crystal display panel.

2. The double-sided liquid crystal display device according to claim 1, the double-sided light source assembly including a light-guiding plate, the plurality of light sources being disposed side by side.

3. The double-sided liquid crystal display device according to claim 2, the light sources including light emitting diodes which are arrayed in a line on a side of the light-guiding plate so that the light-guiding plate functions as a planar light source.

4. The double-sided liquid crystal display device according to claim 2, the light-guiding plate including at least one of a lens sheet and a diffusion sheet on a surface of the light-guiding plate.

5. The double-sided liquid crystal display device according to claim 1, the double-sided light source assembly including a transparent substrate and electroluminescent elements functioning as the light sources, the electroluminescent elements being provided in different regions on the transparent substrate and being capable of emitting light from both sides of the elements.

6. The double-sided liquid crystal display device according to claim 1, the liquid crystal display panels being disposed on an inner surface and an outer surface of a cover which can be opened and closed, the switching device performing lighting control of the light-emitting-region changing device in response to the opening/closing state of the cover.

7. The double-sided liquid crystal display device according to claim 1, the double-sided light source assembly and at least one of the liquid crystal display panels having at least one light-blocking layer therebetween, the at least one light-blocking layer being disposed in a region not having a liquid crystal display panel adjacent thereto.

8. The double-sided liquid crystal display device according to claim 1, the double-sided light source assembly and at least one of the liquid crystal display panels having at least one transflective layer therebetween, the at least one transflective layer reflecting at least some of the light rays incident on the transflective layer.

* * * * *